US007546093B2

(12) United States Patent
Kim

(10) Patent No.: US 7,546,093 B2
(45) Date of Patent: Jun. 9, 2009

(54) ANTENNA UNIT FOR MOBILE TERMINAL

(75) Inventor: Yong-Sik Kim, Gyeonggi-Do (KR)

(73) Assignee: LG Electronics, Inc., Seoul (KR)

( * ) Notice: Subject to any disclaimer, the term of this patent is extended or adjusted under 35 U.S.C. 154(b) by 381 days.

(21) Appl. No.: 11/178,080

(22) Filed: Jul. 8, 2005

(65) Prior Publication Data

US 2006/0009166 A1 Jan. 12, 2006

(30) Foreign Application Priority Data

Jul. 10, 2004 (KR) ...................... 10-2004-0053803

(51) Int. Cl.
*H04B 1/38* (2006.01)

(52) U.S. Cl. ................ 455/90.3; 455/575.5; 455/575.7; 455/83; 455/101; 455/78; 455/575.1; 343/713; 343/895; 343/702

(58) Field of Classification Search ................ 455/90.3, 455/101, 83, 575.5, 575.7, 562.1, 78, 277.2, 455/575.1; 333/103; 324/318
See application file for complete search history.

(56) References Cited

U.S. PATENT DOCUMENTS

| | | | | |
|---|---|---|---|---|
| 5,867,127 | A * | 2/1999 | Black et al. | 343/702 |
| 5,940,040 | A * | 8/1999 | Koyanagi et al. | 343/702 |
| 5,950,116 | A * | 9/1999 | Baro | 455/575.7 |
| 5,977,928 | A * | 11/1999 | Ying et al. | 343/790 |
| 6,034,643 | A * | 3/2000 | Nishikawa et al. | 343/765 |
| 6,061,579 | A * | 5/2000 | Arai et al. | 455/575.7 |
| 6,097,339 | A * | 8/2000 | Filipovic et al. | 343/702 |
| 6,140,970 | A * | 10/2000 | Ylijurva | 343/702 |
| 6,212,413 | B1 * | 4/2001 | Kiesi | 455/575.7 |
| 6,272,356 | B1 * | 8/2001 | Dolman et al. | 455/575.3 |
| 6,307,511 | B1 * | 10/2001 | Ying et al. | 343/702 |
| 6,686,882 | B2 * | 2/2004 | Petros et al. | 343/700 MS |
| 6,693,593 | B1 * | 2/2004 | Burgess | 343/700 MS |
| 6,697,022 | B2 * | 2/2004 | Ponce De Leon et al. | 343/702 |
| 6,850,773 | B1 * | 2/2005 | Ghassabian | 455/550.1 |
| 6,897,825 | B2 * | 5/2005 | Kim et al. | 343/803 |
| 6,898,282 | B2 * | 5/2005 | Cho | 379/428.01 |
| 6,903,694 | B2 * | 6/2005 | Kim | 343/702 |
| 6,909,402 | B2 * | 6/2005 | Vance | 343/702 |
| 6,924,770 | B2 * | 8/2005 | Carpenter et al. | 343/702 |
| 6,937,196 | B2 * | 8/2005 | Korva | 343/702 |
| 6,975,278 | B2 * | 12/2005 | Song et al. | 343/795 |

(Continued)

FOREIGN PATENT DOCUMENTS

| | | |
|---|---|---|
| CN | 1326241 | 12/2001 |

*Primary Examiner*—Marceau Milord
(74) *Attorney, Agent, or Firm*—Lee, Hong, Degerman, Kang & Waimey

(57) ABSTRACT

An antenna unit for a mobile terminal comprises an antenna module rotatably coupled to a terminal body. The antenna module comprises a plurality of antennas disposed inside the antenna module. Each one of the plurality of antennas has a different frequency band. The antenna module is configured to rotate to activate a corresponding antenna of the plurality of antennas. The antenna unit may further comprise a plurality of connection terminals, each of the plurality of connection terminals connected to a different one of the plurality of antennas. The antenna unit may also further comprise a connection plate coupled to a mobile terminal operational circuitry. A connection terminal of the plurality of connection terminals may be selectively connected to the connection plate to activate the corresponding antenna.

14 Claims, 4 Drawing Sheets

U.S. PATENT DOCUMENTS 6,978,165 B2 * 12/2005 Martinez et al. ......... 455/575.7
6,980,782 B1 * 12/2005 Braun et al. ............. 455/277.2
7,010,334 B2 * 3/2006 Saito ....................... 455/575.7
7,024,163 B1 * 4/2006 Barratt et al. ................. 455/69
7,031,751 B2 * 4/2006 Hurler et al. ................ 455/557
7,209,084 B2 * 4/2007 Lindell ....................... 343/702
7,225,002 B2 * 5/2007 Lee et al. ................. 455/575.4
7,363,065 B2 * 4/2008 Lee ......................... 455/575.3

* cited by examiner

ANTENNA UNIT FOR MOBILE TERMINAL

CROSS-REFERENCE TO RELATED APPLICATIONS

Pursuant to 35 U.S.C. § 119(a), this application claims the benefit of earlier filing date and right of priority to Korean Application No. 10-2004-0053803, filed on Jul. 10, 2004, the contents of which are hereby incorporated by reference herein in their entirety.

FIELD OF THE INVENTION

The present invention relates generally to a mobile terminal and, more particularly, to an antenna unit for a mobile terminal.

BACKGROUND OF THE INVENTION

Mobile terminals may be operated in various modes such as PCS (personal communication service) mode, DCN (data communication network) mode, and GPS (global positioning system) mode. Therefore, an antenna used for a mobile terminal must provide for communication at several frequency bands.

FIG. 1 is a sectional view illustrating an antenna unit for a mobile terminal, in accordance with the related art.

Referring to FIG. 1, the antenna unit includes an antenna bushing 104 fixed at an upper end of a terminal body 102, and an antenna 106 threaded into the antenna bushing 104. The antenna unit also includes a connection terminal 108 fixed at the antenna bushing 104, configured to contact a connection pad 112 fixed at a printed circuit board (PCB) 110 installed inside the terminal body 102. The connection terminal 108 thereby connects the antenna 106 to the connection pad 112.

The antenna 106 uses a wide frequency band suitable for various modes such as PCS, DCN and GPS. That is, the antenna 106 may provide a PCS frequency band (RX: 1930~1990 MHz/TX: 1850~1910 MHz), a DCN frequency band (RX: 869~894 MHz/TX: 824~849 MHz) and a GPS frequency band (RX: 1575, 42 MHz).

However, because the antenna 106 must provide frequency bands to satisfy several different modes, the antenna may be difficult and time consuming to manufacture. Furthermore, providing multiple frequency bands using a single antenna may result in degradation of transmission and reception capabilities.

SUMMARY OF THE INVENTION

Accordingly, the present invention is directed to an antenna unit for a mobile terminal that substantially obviates one or more problems due to limitations and disadvantages of the related art.

An object of the present invention is to provide an antenna unit having a plurality of antennas each with a different frequency band, so that when a mobile terminal is operated in a certain mode, an antenna with a frequency band corresponding to the certain mode is selected to optimize transmission and reception capabilities of each mode of the mobile terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, an antenna unit for a mobile terminal comprises an antenna module rotatably coupled to a terminal body. The antenna module comprises a plurality of antennas disposed inside the antenna module. Each one of the plurality of antennas has a different frequency band. The antenna module is configured to rotate to activate a corresponding antenna of the plurality of antennas.

The antenna unit may further comprise a plurality of connection terminals, each of the plurality of connection terminals connected to a different one of the plurality of antennas. The antenna unit may also further comprise a connection plate coupled to a mobile terminal operational circuitry. A connection terminal of the plurality of connection terminals may be selectively connected to the connection plate to activate the corresponding antenna. The antenna unit may also further comprise a driving unit coupled to the antenna module, configured to rotate the antenna module to connect a connection terminal of the plurality of connection terminals to the connection plate to activate the corresponding antenna. The mobile terminal operational circuitry may comprise a printed circuit board.

The antenna module may comprise an antenna case. The antenna case may comprise a first space in which a first antenna is disposed, a second space in which a second antenna is disposed, and an insulator to separate the first space from the second space.

The plurality of antennas may be constructed as helical type antennas. The plurality of connection terminals may have a self-elastic force configured to elastically contact to the connection plate. The driving unit may comprise a rotational shaft connected to a lower end of the antenna module and a driving motor configured to rotate the rotational shaft, wherein the antenna module is rotated when the rotational shaft is rotated. The different frequency band may be selected from at least one of a PCS frequency band, a DCN frequency band, and a GPS frequency band.

In another embodiment, a mobile terminal comprises a terminal body comprising operational circuitry and an antenna unit rotatably coupled to the terminal body, the antenna unit comprising a plurality of antennas. The antenna unit may be configured to rotate to activate a corresponding antenna of the plurality of antennas and each of the plurality of antennas has a different frequency band. The antenna unit may further comprise a first space in which a first antenna is disposed, a second space in which a second antenna is disposed, and an insulator to separate the first space from the second space.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
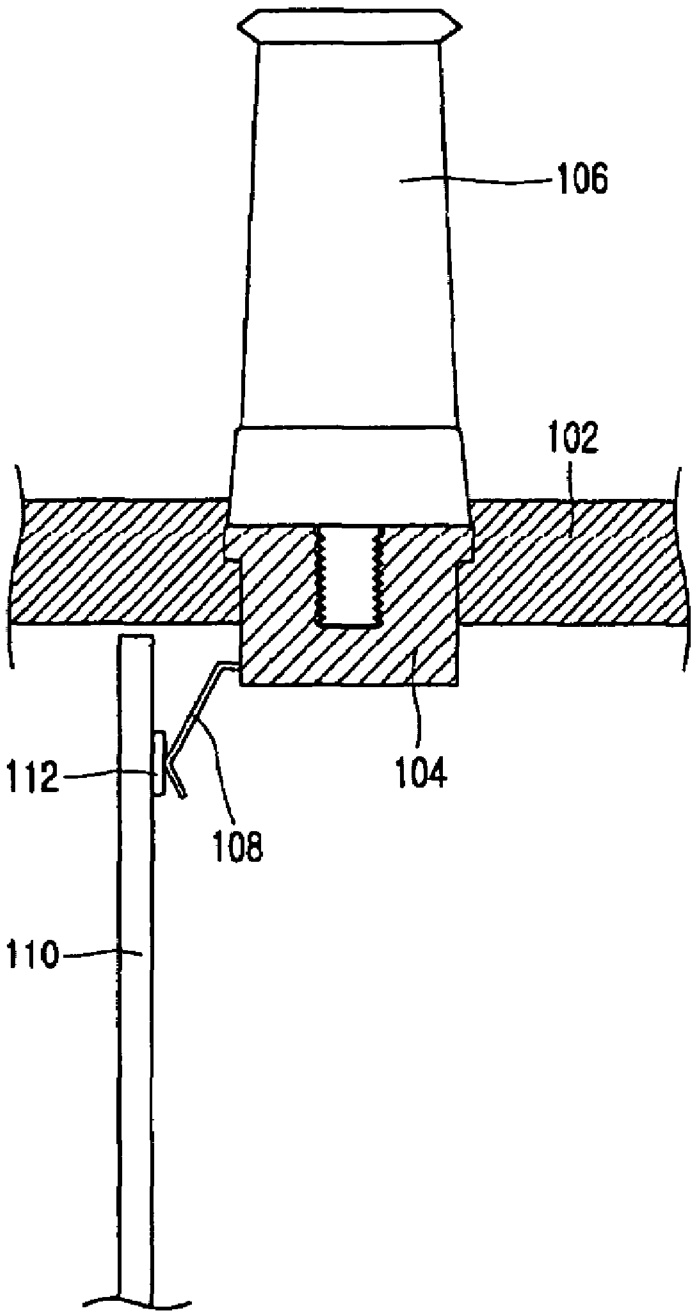
FIG. 1 RELATED ART
FIG. 1 is a sectional view illustrating an antenna unit for a mobile terminal, in accordance with the related art.
Figure 2:
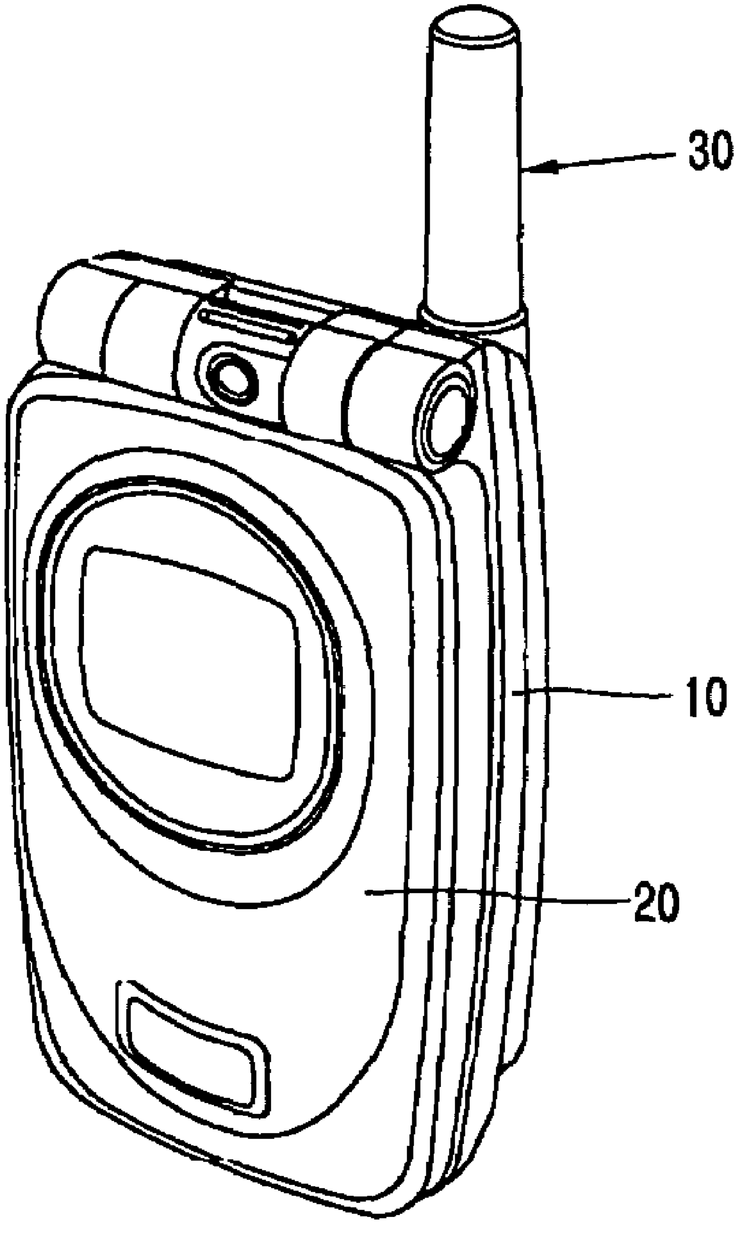
FIG. 2 is a perspective view illustrating a mobile terminal, according to an embodiment of the present invention.
Figure 3:
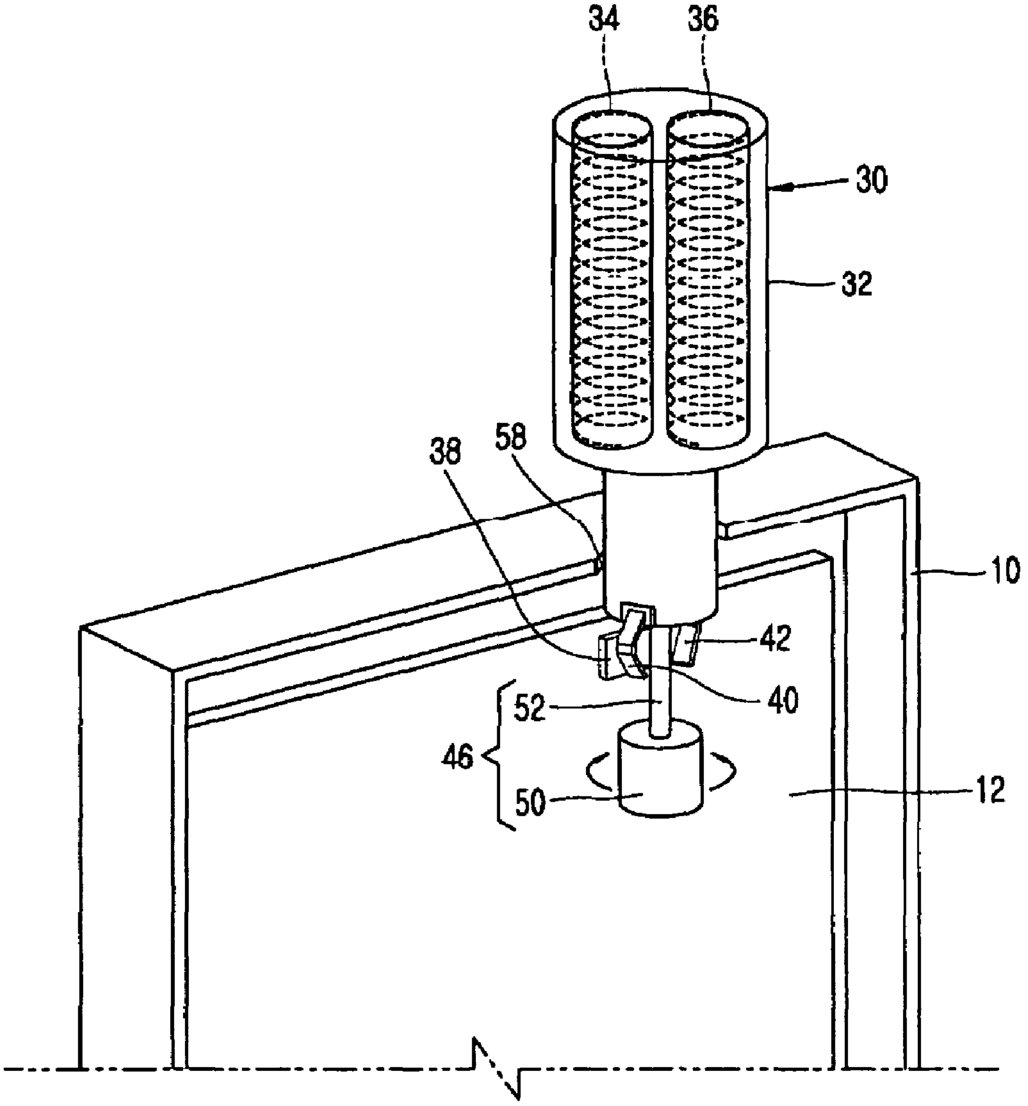
FIG. 3 is a perspective view illustrating an antenna unit for a mobile terminal, according to an embodiment of the present invention.
Figure 4:
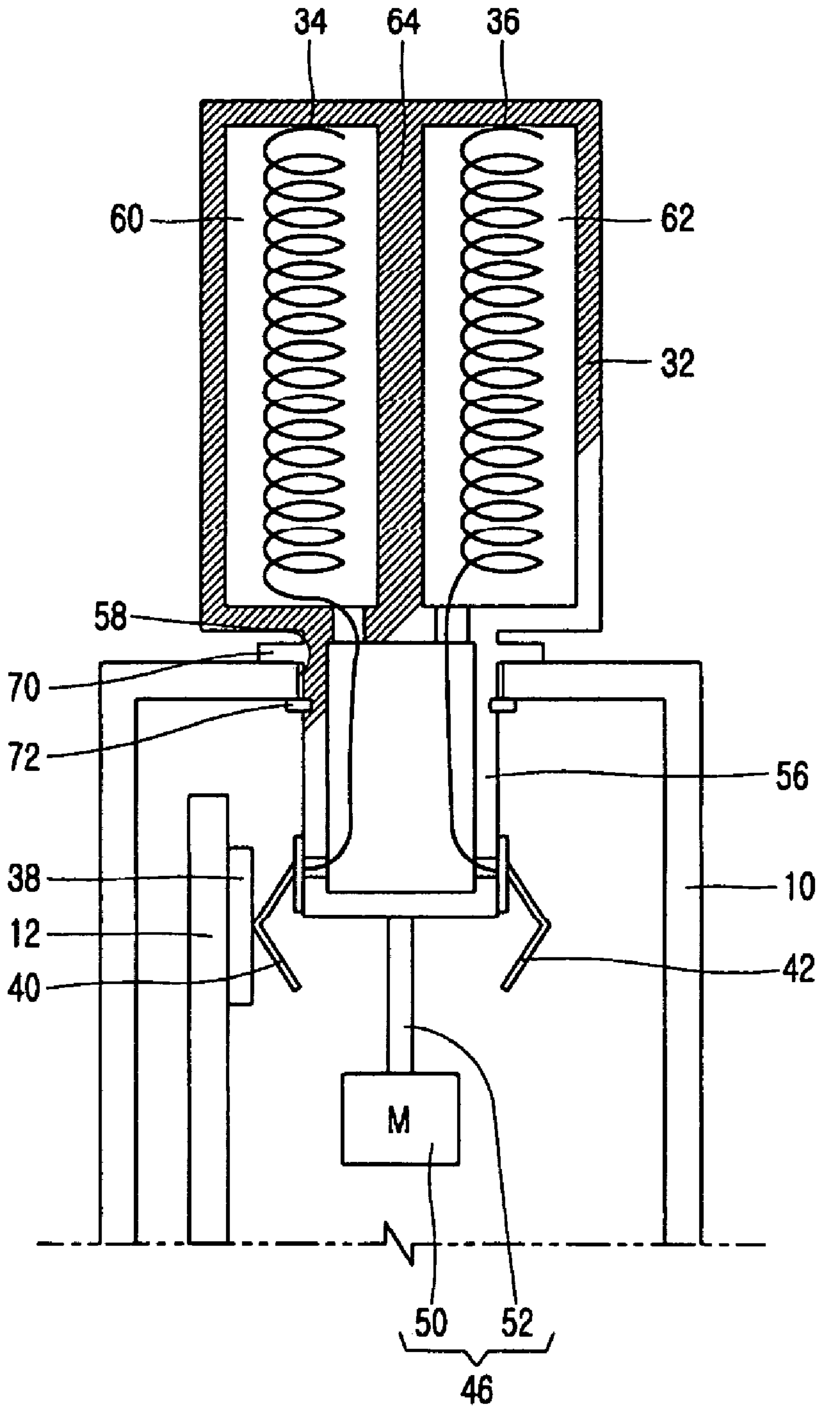
FIG. 4 is a sectional view illustrating an antenna unit for a mobile terminal, according to an embodiment of the present invention.

FIG. 2 is a perspective view illustrating a mobile terminal, according to an embodiment of the present invention. FIG. 3 is a perspective view illustrating an antenna unit for a mobile terminal, according to an embodiment of the present invention. FIG. 4 is a sectional view illustrating an antenna unit for a mobile terminal, according to an embodiment of the present invention.

Referring to FIGS. 2-4, a mobile terminal 200 includes a terminal body 10 having a keypad formed at a front surface thereof, configured to allow a user to input information and a printed circuit board (PCB) 12 with various circuit components therein. The mobile terminal 200 also includes a display unit 20 hingedly coupled to the terminal body 10, configured to open and close at the hinged coupling, and having an LCD for displaying various information. The mobile terminal 200 also includes an antenna unit 30 mounted to the terminal body 10, configured to transmit and receive radio waves bearing voice and image information to and from the PCB 12. The antenna unit 30 includes a plurality of antennas, each antenna having a different frequency band to correspond to different modes of the mobile terminal 200. The different modes of the mobile terminal may include, for example, PCS (personal communication service) mode, DCN (data communication network) mode, and GPS (global positioning system) mode. The PCS frequency band may be (RX: 1930~1990 MHz/TX: 1850~1910 MHz). The DCN frequency band may be (RX: 869~894 MHz/TX: 824~849 MHz). The GPS frequency band may be (RX: 1575, 42 MHz).

Referring to FIGS. 3-4, the antenna unit 30 includes an antenna case 32 rotatably mounted at an upper end of the terminal body 10. The antenna unit 30 also includes a plurality of antennas, e.g. a first antenna 34 and a second antenna 36. The first antenna 34 and the second antenna 36 are disposed in the antenna case 32 such that the first antenna 34 and the second antenna 36 are mutually insulated. The first antenna 34 and the second antenna 36 each have a different frequency band. The antenna unit 30 also includes connection terminals 40 and 42 respectively connected to the plurality of antennas 34 and 36. The connection terminals 40 and 42 selectively contact a connection pad 38 that is mounted to the PCB 12. The antenna unit 30 also includes a driving unit 46 configured to rotate the antenna case 32 to connect one of the connection terminals 40 and 42 to the connection pad 38.

The antenna case 32 has a cylindrical shape and includes at least a first space 60 and a second space 62 in which the antennas 34 and 36 are disposed, respectively. The first space 60 and the second space 62 are separated by an insulation film 64. A rotation support 56 is formed at a lower end of the antenna case 32 and is rotatably supported by the terminal 10.

The rotation support 56 has a cylindrical shape and is inserted into a through hole 58 formed in the terminal body 10. The rotation support 56 includes a stopper 70 formed at a portion disposed at an outer side of the terminal body 10 and a snap ring 72 formed at a portion disposed at an inner side of the terminal body 10. The snap ring 72 prevents the rotation support 56 from being released from the through hole 58 of the terminal body 10.

The first and second antennas 34 and 36 may preferably be constructed as helical type antennas. The first antenna 34 has a first frequency band and is disposed in the first space 60 of the antenna case 32. The second antenna 36 has a second frequency band and is disposed in the second space 62. The first frequency band may be different from the second frequency band. The frequency bands may be selected from, for example, the PCS frequency band (RX: 1930~1990 MHz/TX: 1850~1910 MHz), the DCN frequency band (RX: 869~894 MHz/TX: 824~849 MHz) or the GPS frequency band (RX: 1575, 42 MHz).

In one embodiment, the first antenna 34 has a frequency band that satisfies the PCS frequency band (RX: 1900~2000 MHz/TX: 1800~1950 MHz) and the GPS frequency band (RX: 1575, 42 MHz). In the embodiment, the second antenna 36 has a frequency band that satisfies the DCN frequency band (RX: 850~920 MHz/TX: 824~849 MHz) and the GPS frequency band (RX: 1575, 42 MHz).

Also, in the embodiment, the first and second connection terminals 40 and 42 are mounted to protrude in an outward direction from an outer circumferential surface of the rotation support 56. The first connection terminal 40 is connected to the first antenna 34 and elastically contacts the connection pad 38 of the PCS 12. The second connection terminal 42 is connected to the second antenna 36 and elastically contacts the connection pad 38 of the PCB 12. The first and second connection terminals 40 and 42 are disposed such that they are not in direct contact with each other.

The driving unit 46 includes a rotational shaft 52 connected to a lower end of the antenna case 32 and a driving motor 50 configured to rotate the antenna case 32 by rotating the rotational shaft 52.

The driving motor 50 may be connected to a control unit. The control unit may be an electromagnetic unit. When the mobile terminal 200 is operated in the DCN and the PCS modes, for example, the driving motor 50 receives a signal applied from the control unit and rotates the rotational shaft 50 in a forward direction or in a backward direction to make an appropriate connection terminal of the first and second connection terminals 40 and 42 contact the connection pad 38 of the PCB 12.

In operation of the antenna unit 30, in a case where the mobile terminal 200 is used in a PCS area, the driving motor 50 is driven upon receiving a signal from the control unit to rotate the rotational shaft 52. The rotation of the rotational shaft 52 causes the first connection terminal 40 to contact the connection pad 38 of the PCB 12. The first antenna 34 is thus connected to the PCB 12 and transmits and receives radio waves of the PCS frequency band. In this exemplary case, radio waves of the GPS frequency band may also be transmitted and received.

In another exemplary case, the mobile terminal is used in a DCN area. The driving motor 50 is driven upon receiving a signal from the control unit to rotate the rotational shaft 52. The rotation of the rotational shaft 52 causes the second connection terminal 42 to contact the connection pad 38 of the PCB 12. The second antenna 36 is thus connected to the PCB 12 and transmits and receives radio waves of the DCN frequency band. In this exemplary case, radio waves of the GPS frequency band may also be transmitted and received.

In one embodiment, an antenna unit for a mobile terminal comprises an antenna module rotatably coupled to a terminal body. The antenna module comprises a plurality of antennas disposed inside the antenna module. Each one of the plurality of antennas has a different frequency band. The antenna module is configured to rotate to activate a corresponding antenna of the plurality of antennas.

The antenna unit may further comprise a plurality of connection terminals, each of the plurality of connection terminals connected to a different one of the plurality of antennas. The antenna unit may also further comprise a connection plate coupled to a mobile terminal operational circuitry. A connection terminal of the plurality of connection terminals may be selectively connected to the connection plate to activate the corresponding antenna. The antenna unit may also further comprise a driving unit coupled to the antenna module, configured to rotate the antenna module to connect a connection terminal of the plurality of connection terminals to the connection plate to activate the corresponding antenna. The mobile terminal operational circuitry may comprise a printed circuit board.

The antenna module may comprise an antenna case. The antenna case may comprise a first space in which a first antenna is disposed, a second space in which a second antenna is disposed, and an insulator to separate the first space from the second space.

The plurality of antennas may be constructed as helical type antennas. The plurality of connection terminals may have a self-elastic force configured to elastically contact to the connection plate. The driving unit may comprise a rotational shaft connected to a lower end of the antenna module and a driving motor configured to rotate the rotational shaft, wherein the antenna module is rotated when the rotational shaft is rotated. The different frequency band may be selected from at least one of a PCS frequency band, a DCN frequency band, and a GPS frequency bond.

In another embodiment, a mobile terminal comprises a terminal body comprising operational circuitry and an antenna unit rotatably coupled to the terminal body, the antenna unit comprising a plurality of antennas. The antenna unit may be configured to rotate to activate a corresponding antenna of the plurality of antennas and each of the plurality of antennas has a different frequency band. The antenna unit may further comprise a first space in which a first antenna is disposed, a second space in which a second antenna is disposed, and an insulator to separate the first space from the second space.

The present invention provides an antenna unit for a mobile terminal in which two or more antennas, each with a different frequency band, are provided in an antenna module or antenna case. Thus, when the mobile terminal is used in a certain mode, an antenna with a suitable frequency band may be selectively used. Therefore, frequency transmission and reception performance of the antenna may be optimized and performance of the mobile terminal may be enhanced.

Although the present invention has been described with reference to 'flip-type' mobile terminals, the present invention may also be applied to other types of mobile terminals, such as 'bar type' and 'sliding type' mobile terminals.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. An antenna unit for a mobile terminal, the antenna unit comprising:

a rotatable antenna module coupled to a terminal body, the antenna module comprising a plurality of antennas disposed inside the rotatable antenna module, each one of the plurality of antennas having a different frequency band, wherein the rotatable antenna module is configured to rotate to activate a corresponding antenna of the plurality of antennas disposed inside the rotatable antenna module; a plurality of connection terminals, each of the plurality of connection terminals connected to a different one of the plurality of antennas; a connection plate coupled to a mobile terminal operational circuitry; wherein a connection terminal of the plurality of connection terminals is selectively connected to the connection plate to activate the corresponding antenna; and a driving unit coupled to the rotatable antenna module, configured to rotate the rotatable antenna module to connect the connection terminal of the plurality of connection terminals to the connection plate to activate the corresponding antenna.

2. The antenna unit of claim 1, wherein the mobile terminal operational circuitry comprises a printed circuit board.

3. The antenna unit of claim 1, wherein the rotatable antenna module comprises an antenna case, the antenna case comprising:

a first space in which a first antenna is disposed;

a second space in which a second antenna is disposed; and an insulator to separate the first space from the second space.

4. The antenna unit of claim 1, wherein the plurality of antennas are constructed as helical type antennas.

5. The antenna unit of claim 1, wherein the plurality of connection terminals have a self-elastic force configured to elastically contact to the connection plate.

6. The antenna unit of claim 1, wherein the driving unit comprises a rotational shaft connected to a lower end of the rotatable antenna module and a driving motor configured to rotate the rotational shaft, wherein the rotatable antenna module is rotated when the rotational shaft is rotated.

7. The antenna unit of claim 1, wherein the different frequency band comprises at least one of a PCS frequency band, a DCN frequency band, and a GPS frequency band.

8. A mobile terminal, comprising: a terminal body comprising an operational circuitry; a rotatable antenna unit coupled to the terminal body, the rotatable antenna unit comprising a plurality of antennas, wherein, the rotatable antenna unit is configured to rotate to activate a corresponding antenna of the plurality of antennas and each of the plurality of antennas having a different frequency band: a plurality of connection terminals, each of the plurality of connection terminals connected to a different one of the plurality of antennas; and a connection plate coupled to the operational circuitry, wherein a connection terminal of the plurality of connection terminals is selectively connected to the connection plate to activate the corresponding antenna; and a driving unit coupled to the rotatable antenna unit, configured to rotate the rotatable antenna unit to connect the connection terminal of the plurality of connection terminals to the connection plate to activate the corresponding antenna.

9. The mobile terminal of claim 8, wherein the operational circuitry comprises a printed circuit board.

10. The mobile terminal of claim 8, wherein the antenna unit further comprises:

a first space in which a first antenna is disposed;

a second space in which a second antenna is disposed; and an insulator to separate the first space from the second space.

11. The mobile terminal of claim 8, wherein the plurality of antennas are constructed as helical type antennas.

12. The mobile terminal of claim 8, wherein the plurality of connection terminals have a self-elastic force configured to elastically contact to the connection plate.

13. The mobile terminal of claim 8, wherein the driving unit comprises a rotational shaft connected to a lower end of the rotatable antenna unit and a driving motor configured to rotate the rotational shaft, wherein the rotatable antenna unit is rotated when the rotational shaft is rotated.

14. The mobile terminal of claim 8, wherein the different frequency band comprises at least one of a PCS frequency band, a DCN frequency band, and a GPS frequency band.

* * * * *